United States Patent
Daumer et al.

(10) Patent No.: US 12,238,525 B2
(45) Date of Patent: Feb. 25, 2025

(54) SIM SWAP SCAM PROTECTION VIA PASSIVE MONITORING

(71) Applicant: EXFO Solutions SAS, Saint-Jacques-de-la-Lande (FR)

(72) Inventors: Christopher Daumer, Rennes (FR); Christophe Gay, Rennes (FR)

(73) Assignee: EXFO Solutions SAS, Saint-Jacques-de-la-Lande (FR)

(*) Notice: Subject to any disclaimer, the term of this patent is extended or adjusted under 35 U.S.C. 154(b) by 94 days.

(21) Appl. No.: 17/510,460

(22) Filed: Oct. 26, 2021

(65) Prior Publication Data

US 2022/0141669 A1     May 5, 2022

Related U.S. Application Data (60) Provisional application No. 63/107,592, filed on Oct. 30, 2020.

(51) Int. Cl.
| | |
|---|---|
| *H04W 12/72* | (2021.01) |
| *H04W 4/14* | (2009.01) |
| *H04W 12/121* | (2021.01) |

(52) U.S. Cl.
CPC ............. *H04W 12/72* (2021.01); *H04W 4/14* (2013.01); *H04W 12/121* (2021.01)

(58) Field of Classification Search
CPC ...... H04W 12/72; H04W 12/121; H04W 4/14
(Continued)

(56) References Cited

U.S. PATENT DOCUMENTS

| | | | | |
|---|---|---|---|---|
| 8,074,115 | B2 * | 12/2011 | Stolfo | ................. G06F 11/0772 714/38.1 |
| 8,406,758 | B2 | 3/2013 | Tagg et al. | |

(Continued)

FOREIGN PATENT DOCUMENTS

| | | | | |
|---|---|---|---|---|
| EP | 2975874 A1 * | 1/2016 | ........... H04B 1/3816 |
| GB | 2534400 A * | 7/2016 | ......... G06Q 20/3224 |

(Continued)

OTHER PUBLICATIONS

Suksmono et al., "A research on usage pattern and analysis technique for communication fraud: SIM cloning and surfing," 2006 International Conference on Computing & Informatics, Kuala Lumpur, 2006, pp. 1-6, doi: 10.1109/ICOCI.2006.5276492. (Year: 2006).*

(Continued)

*Primary Examiner* — Peter C Shaw
(74) *Attorney, Agent, or Firm* — Baratta Law PLLC; Lawrence A. Baratta, Jr.; Ryan Odessa (57) ABSTRACT

Subscriber identity module (SIM) swap scam detection include receiving wireless network data based on passive monitoring of a wireless network; identifying a subscriber identity module, SIM, card change in user equipment, UE, based on changes in identifiers in the wireless network data; identifying a commercial user communication with the UE after the SIM card change; and detecting potentially fraudulent activity for the UE based on a combination of the SIM card change, the commercial user communication, and a time period therebetween. The steps can further include providing an alert of the potentially fraudulent activity identifying the commercial user communication as a possible SIM swap scam.

18 Claims, 4 Drawing Sheets

(58) Field of Classification Search
USPC .......................................................... 726/23
See application file for complete search history.

(56) References Cited

U.S. PATENT DOCUMENTS

| | | | |
|---|---|---|---|
| 8,849,254 B2 | 9/2014 | Bolon et al. | |
| 10,178,223 B1* | 1/2019 | Marimuthu | H04B 1/3816 |
| 10,341,871 B2 | 7/2019 | Velusamy et al. | |
| 10,602,383 B1* | 3/2020 | Horton | H04L 41/0663 |
| 11,582,610 B1* | 2/2023 | Wolff | H04W 12/40 |
| 2004/0194106 A1* | 9/2004 | Ogawa | H04L 61/4511 |
| | | | 718/100 |
| 2006/0009214 A1* | 1/2006 | Cardina | H04W 12/126 |
| | | | 455/410 |
| 2011/0141924 A1* | 6/2011 | Froehlich | H04L 43/12 |
| | | | 370/252 |
| 2011/0178863 A1* | 7/2011 | Daigle | G06Q 30/0225 |
| | | | 705/14.69 |
| 2012/0289191 A1* | 11/2012 | Puura | H04L 51/58 |
| | | | 455/406 |
| 2014/0172712 A1 | 6/2014 | Petersen et al. | |
| 2015/0038120 A1 | 2/2015 | Larkin | |
| 2015/0269577 A1* | 9/2015 | Avegliano | G06Q 20/4016 |
| | | | 705/44 |
| 2016/0021532 A1 | 1/2016 | Schenk et al. | |
| 2017/0195204 A1* | 7/2017 | Fournier | G06N 7/01 |
| 2017/0230900 A1* | 8/2017 | Velusamy | H04M 17/204 |
| 2019/0174449 A1* | 6/2019 | Shan | H04W 60/04 |
| 2020/0045519 A1* | 2/2020 | Raleigh | G06F 3/0482 |
| 2020/0120483 A1* | 4/2020 | Chikkala | H04W 12/40 |
| 2020/0245142 A1 | 7/2020 | Manepalli et al. | |
| 2020/0267554 A1* | 8/2020 | Faccin | H04L 63/101 |
| 2021/0195411 A1* | 6/2021 | Ratnakaram | H04L 63/0853 |
| 2021/0359991 A1* | 11/2021 | Mumick | H04L 63/0838 |
| 2022/0012743 A1* | 1/2022 | Snell | G06Q 20/322 |
| 2022/0255945 A1* | 8/2022 | Guan | H04L 63/102 |
| 2023/0027934 A1* | 1/2023 | Raleigh | H04L 12/1407 |

FOREIGN PATENT DOCUMENTS

| | | | | |
|---|---|---|---|---|
| GB | 2582169 A | * | 9/2020 | ............. G06Q 20/40 |
| IE | 20210139 A1 | * | 2/2022 | ............. H04W 12/00 |
| WO | WO-2006067026 A1 | * | 6/2006 | ........... G06F 9/5072 |
| WO | WO-2011058358 A1 | * | 5/2011 | ......... H04L 43/0829 |
| WO | 2016050990 A1 | | 4/2016 | |
| ZA | 200906538 B | | 5/2010 | |

OTHER PUBLICATIONS

Kashir et al., "Machine Learning Techniques for SIM Box Fraud Detection," 2019 International Conference on Communication Technologies (ComTech), Rawalpindi, Pakistan, 2019, pp. 4-8, doi: 10.1109/COMTECH.2019.8737828. (Year: 2019).*

Ighneiwa et al., "Bypass Fraud Detection: Artificial Intelligence Approach," arXiv:1711.04627v1, Nov. 4, 2017. (Year: 2017).*

Faircloth et al., "A Study on Brute Force Attack on T-Mobile Leading to SIM-Hijacking and Identity-Theft," 2022 IEEE World AI IoT Congress (AIIoT), Seattle, WA, USA, 2022, pp. 501-507, doi: 10.1109/AIIoT54504.2022.9817175. (Year: 2022).*

Kouam et al., "SIMBox Bypass Frauds in Cellular Networks: Strategies, Evolution, Detection, and Future Directions, " in IEEE Communications Surveys & Tutorials, vol. 23, No. 4, pp. 2295-2323, Fourthquarter 2021, doi: 10.1109/COMST.2021.3100916. (Year: 2021).*

Ighneiwa et al., "Bypass Fraud Detection: Artificial Intelligence Approach," arXiv:1711.04627, Nov. 4, 2017. (Year: 2017).*

Kim et al., "A Study of the Emerging Trends in SIM Swapping Crime and Effective Countermeasures," 2022 IEEE/ACIS 7th International Conference on Big Data, Cloud Computing, and Data Science (BCD), Danang, Vietnam, 2022, pp. 240-245, doi: 10.1109/BCD54882.2022.9900510. (Year: 2022).*

Bhavana et al., "Understanding the Implications of SIM Card Swap Fraud in India: A Comprehensive Study," 2024 International Conference on Communication, Computing and Internet of Things (IC3IoT), Chennai, India, 2024, pp. 1-8, doi: 10.1109/ IC3IoT60841.2024.10550217. (Year: 2024).*

Aiemworawutikul et al., "Vulnerability Assessment in National Identity Services," Dec. 5, 2019, pp. 1-30.

* cited by examiner

SIM SWAP SCAM PROTECTION VIA PASSIVE MONITORING

CROSS-REFERENCE TO RELATED APPLICATION(S)

The present disclosure claims priority to U.S. Provisional Patent Application No. 63/107,592, filed Oct. 30, 2020, the contents of which are incorporated by reference in their entirety.

FIELD OF THE DISCLOSURE

The present disclosure generally relates to networking. More particularly, the present disclosure relates to systems and methods for subscriber identity module (SIM) swap scam protection via passive monitoring.

BACKGROUND OF THE DISCLOSURE

Two-factor authentication (2FA)—also known as two-step verification or multifactor authentication—adds a layer of security to online account logins, for use with content or service provider applications such as Amazon, Apple and Google to Facebook, Instagram and Twitter and for any business or banking applications. Instead of just entering a password to access an account, the user needs to enter a password—the first verification factor—and then a code sent via short message service (SMS), given in a voice call, or through a prompt in an authentication application ("app")—the second factor, which is a one-time password (OTP). This means a hacker would need to steal both the password and the user's phone or device to break into the account.

A SIM swap scam (also known as port-out scam, SIM splitting, Smishing and simjacking, SIM swapping) is a type of account takeover fraud that generally targets a weakness in two-factor authentication and two-step verification in which the second factor or step is a text message (SMS) or call placed to a mobile. The fraud exploits a mobile phone service provider's ability to seamlessly port a telephone number to a device containing a different SIM. This feature is normally used when a customer has lost or had their phone stolen or is switching service to a new phone. With the SIM swap scam, a malicious actor is able to gain access to a victim's entire online presence, including financial accounts, email, social media, and the like.

BRIEF SUMMARY OF THE DISCLOSURE

The present disclosure relates to systems and methods for subscriber identity module (SIM) swap passive protection. A new passive monitoring solution is proposed to provide more data to the network operator to support fraud detection. In particular, the present disclosure detects SIM card changes based on international mobile subscriber identity (IMSI)/subscription permanent identifier (SUPI) and mobile subscriber ISDN number (where ISDN is integrated services digital network) changes. This data is available in passive monitoring, the IMSI/SUPI and MSISDN mapping to SIM data is available to a network operator (i.e., a cellular provider, wireless provider, mobile operator, etc.). The network operator is also capable of detecting communications from a commercial user. The present disclosure utilizes this data, namely a SIM card change coupled with communications from a commercial user, to provide a passive monitoring solution to detect potential fraud due to a SIM swap scam.

In various embodiments, the present disclosure includes a method having steps, a system including at least one processor and memory with instructions that, when executed, cause the at least one processor to implement the steps, and a non-transitory computer-readable medium having instructions stored thereon for programming at least one processor to perform the steps. The steps include receiving wireless network data based on passive monitoring of a wireless network; identifying a SIM card change in user equipment (UE) based on changes in identifiers in the wireless network data; identifying a commercial user communication with the UE after the SIM card change; and detecting potentially fraudulent activity for the UE based on a combination of the SIM card change, the commercial user communication, and a time period therebetween. The steps can further include providing an alert of the potentially fraudulent activity identifying the commercial user communication as a possible SIM swap scam. The alert can include IMSI contents. The alert can be to the commercial user for remediation of an affected account associated with a user of the UE.

The SIM card change can be identified based on IMSI/SUPI and MSISDN changes detected in the wireless network data. The IMSI/SUPI and the MSISDN can be stored as a pair and the SIM card change includes a change in any stored pair in a database. Stored pairs in the database can be deleted after a predetermined storage duration and deleted thereafter based on a time of last activity. The commercial user communication can include a short message service (SMS) communication. The commercial user communication can be detected based on any of a short code number and an alphanumeric sender identifier. The commercial user communication can be detected based on detection of an identifier of a commercial user in packet data to the UE. The time period can be adjusted based on feedback including false positives and false negatives. The identifying steps can utilize information in packets stored in the wireless network data. The wireless network data can include historical data to avoid false alarms.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for subscriber identity module (SIM) swap passive protection. A new passive monitoring solution is proposed to provide more data to the network operator to support fraud detection. In particular, the present disclosure detects SIM card changes based on international mobile subscriber identity (IMSI)/subscription permanent identifier (SUPI) and Mobile Subscriber ISDN Number (where ISDN is Integrated Services Digital Network) changes. This data is available in passive monitoring, the IMSI/SUPI and MSISDN mapping to SIM data is available to a network operator (i.e., a cellular provider, wireless provider, mobile operator, etc.). The network operator is also capable of detecting communications from a commercial user. The present disclosure utilizes this data, namely a SIM card change coupled with communications from a commercial user, to provide a passive monitoring solution to detect potential fraud due to a SIM swap scam.

Figure 1:
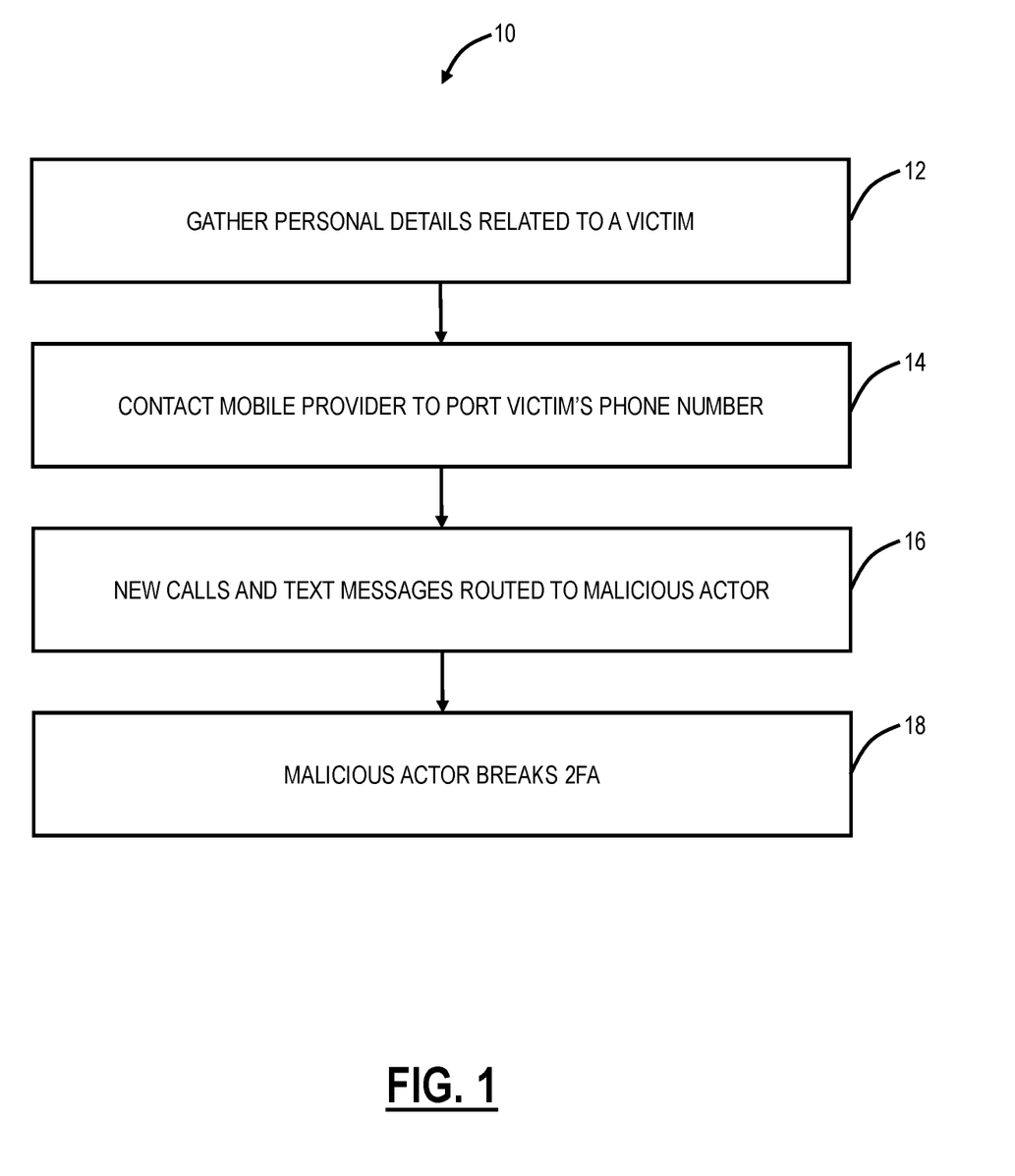
FIG. 1 is a flowchart illustrating a process of a conventional SIM swap scan.

FIG. 1 is a flowchart illustrating a process 10 of a conventional SIM swap scan. The process 10 includes a malicious actor gathering personal details about the victim (step 12), such as by using phishing emails, by buying them from organized criminals, or by directly socially engineering the victim. Once the malicious actor has obtained these details, they then contact the victim's mobile telephone provider and use social engineering techniques to convince the telephone company to port the victim's phone number to a SIM associated with the malicious actor (step 14). This is done, for example, by impersonating the victim using personal details to appear authentic and claiming that they have lost their phone. In some cases, SIM numbers are changed directly by telecom company employees bribed by criminals.

Once the user's phone number is assigned to the malicious actor's SIM card, all of the incoming calls and text messages will be routed to whatever phone the malicious actor's SIM card is in (step 16). Once this happens the victim's phone will lose connection to the network and the malicious actor will receive all the SMS and voice calls intended for the victim. Upon realization that the phone does not have connection to the network, the victim will typically try to reconnect to their accounts via wi-fi or through use of a different phone/device. The victim may also request password reinitiating. Commercial account providers will then verify the user's identity by sending a one-time password. If using SMS or a voice call for the second factor, the malicious actor will intercept any one-time passwords sent via text or telephone calls sent to the victim, and thus circumvent any security features of accounts (be they bank accounts, social media accounts, etc.) that rely on text messages or telephone calls (step 18). Thereafter, a malicious actor can easily take over a victim's entire online presence, and in a very short time.

When a text message comes from a business or commercial entity, such as a bank, financial institution, or social network, it typically uses application-to-person (A2P) messaging. A2P is a type of SMS sent from a subscriber to an application or sent from an application to a subscriber. A2P messaging includes (but is not limited to) marketing messages, appointment reminders, chat bots or virtual assistants, notifications, and one-time passwords (OTPs) or personal identification number (PIN) codes. Two sender issuer number options have emerged: Short Codes and Alphanumeric Sender IDs. In the US, carriers have traditionally preferred that A2P messages must be sent using a short code rather than a standard long code. However, A2P messages over long codes are also used. In the United Kingdom, A2P messages can be sent with a dynamic 11-character sender ID; however, short codes are used for OPTOUT commands. Identifying that a SMS message is part of a A2P messaging allows to confirm that the source of the message is commercial.

Network operators are trying to identify when SIM swapping fraud has occurred. When they believe that such a fraud has occurred, they can alert the service provider (bank, social media, etc.) for further inquiry and remediation.

The network operator needs more data to determine the level of confidence it has in its fraud detection, and the present disclosure provides a passive monitoring solution.

Passive Monitoring

Figure 2:
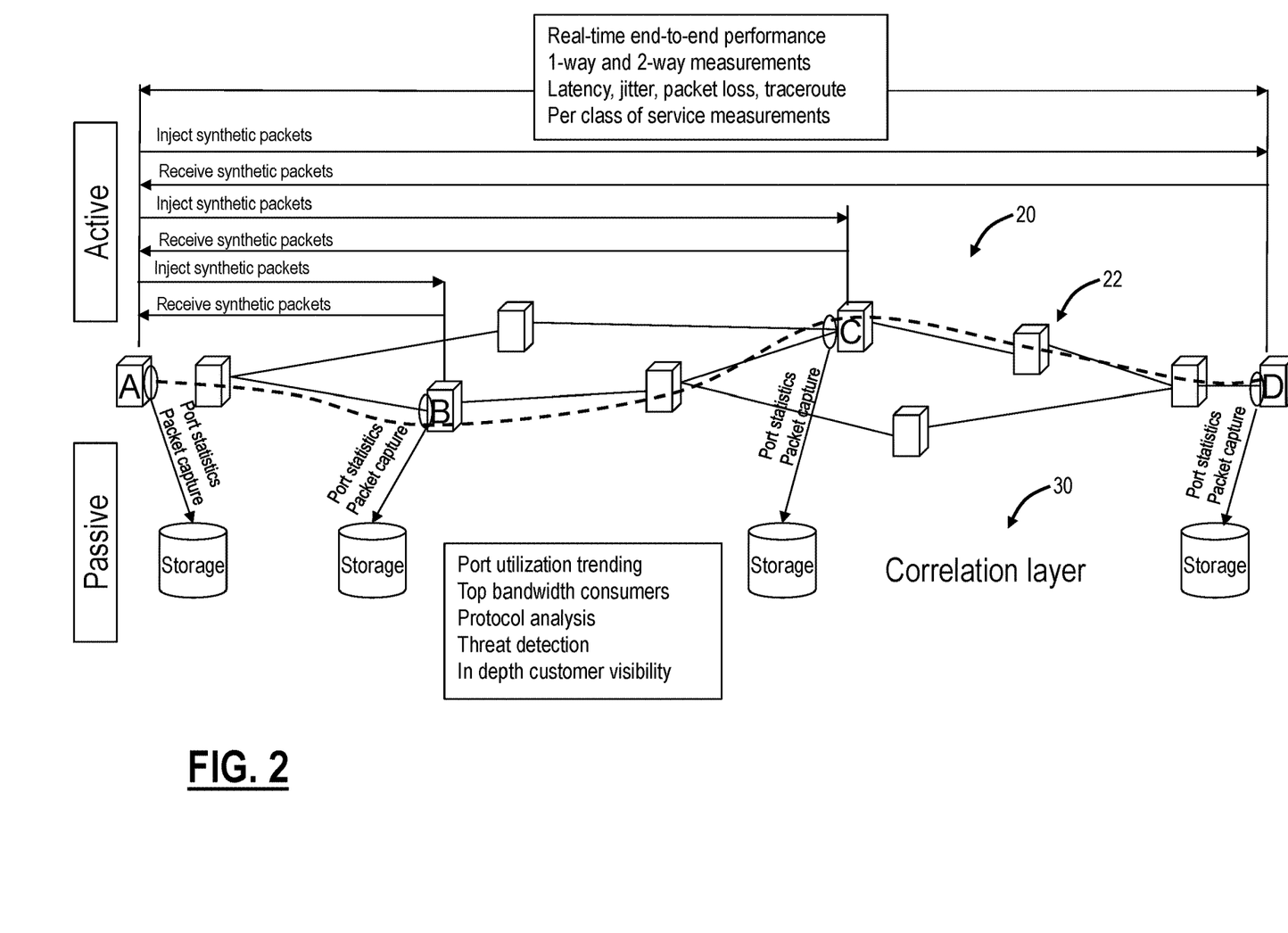
FIG. 2 is a network diagram illustrating the difference between active monitoring and passive monitoring in a mobile network.

FIG. 2 is a network diagram illustrating the difference between active monitoring and passive monitoring in a mobile network 20. The mobile network 20 includes a plurality of nodes 22 (network elements, base stations, switches, routers, etc.) that connect a source A to a destination D. The source A can be user equipment (UE), i.e., a mobile device. Active monitoring generally includes active testing in the mobile network 20. Passive monitoring generally includes post processing on captured data in a correlation layer 30 which can include compute resources, storage resources, etc.

Active monitoring: Also known as synthetic monitoring, involves injecting test traffic into the network, typically with the same forwarding criteria as the user traffic (service) being monitored, and then measuring its performance. These tests can either be one-way (from source 'A' to destination 'D' or round trip (from source 'A' to destination 'D' and back to source 'A'), depending on what you want to measure. Since test traffic mimics the service traffic, active testing is ideal for providing a real-time view of the end-to-end performance of a service with regards to such things as latency (or delay), jitter (or delay variation), or packet loss. It's worth noting that active testing can be performed between any 2 sites along the service path, for example, from source 'A' to site 'B' or source 'A' to site 'C'. This means that it is possible to segment the overall end-to-end path so that performance indicators can be derived on a per segment basis, providing greater, real-time visibility into where issues might be located. Active monitoring is the primary approach for policing service layer agreements (SLAs), since it provides a real-time view of performance.

Passive monitoring: This technique involves capturing and analyzing live network traffic, or traffic statistics, at a specific point in the network—for example, the network interface to an application server. As its name suggests, passive monitoring does not require another site in the network to be involved, or even aware. At its simplest, passive monitoring may be nothing more than the periodic collecting of port statistics, Ike byte and packet transmit and receive numbers. More typically, it also involves capturing some, or all, of the traffic flowing through a port for detailed, non-real-time, analysis of things like signaling protocols, application usage or top bandwidth consumers. Passive monitoring is ideally suited for in depth traffic and protocol analysis, especially in a 'post-event' scenario such as root cause analysis. It is also well suited to gaining in depth visibility into the customers quality of experience (QoE).

Definitions

A SIM card, also known as subscriber identity module or subscriber identification module (SIM), is an integrated circuit running a card operating system (COS) that is intended to securely store the international mobile subscriber identity (IMSI) number and its related key, which are used to identify and authenticate subscribers on mobile telephony devices (such as mobile phones and computers). SIM cards are used on wireless devices, UE, including Internet of things (IoT), mobile phones, etc. SIM cards are used in Global System for Mobile Communications (GSM), Code-division multiple access (CDMA), Universal Mobile Telecommunications System (UMTS), Long Term Evolution (LTE), 5G, etc.

The international mobile subscriber identity (IMSI) is a number that uniquely identifies every user of a cellular network. It is stored as a 64-bit field and is sent by the mobile device to the network. It is also used for acquiring other details of the mobile in the home location register (HLR) or as locally copied in the visitor location register. The IMSI is used in any mobile network that interconnects with other networks. For GSM, UMTS and LTE networks, this number was provisioned in the SIM card. Note, in 5G, this number is called the subscription permanent identifier (SUPI). Note, these are the same number and format. As used herein, the terms IMSI and SUPI are interchangeably.

MSISDN is a number uniquely identifying a subscription in a GSM, UMTS, LTE, or 5G mobile network. It is the mapping of the telephone number to the SIM in a mobile or cellular phone. This abbreviation has several interpretations including "Mobile Station International Subscriber Directory Number," "Mobile Subscriber ISDN Number," "Mobile Station International ISDN Number(s)," "Mobile International ISDN Number," etc.

A commercial user includes any of a company, social network, bank, financial institution that communicates to a user for 2FA, password reset, activity notifications, fraudulent alerts etc. As described herein, the commercial user can be detected in communications with a source A through various techniques including detection of A2P messaging, database lookups of known addresses, and the like. Again, once a SIM swap occurs with a malicious actor, any communication from the commercial user is intercepted and the malicious actor can hijack the user's accounts.

Passive Monitoring for SIM Swap Scam Detection

Again, the IMSI/SUPI and MSISDN mapping to SIM data is available to a network operator (i.e., a cellular provider, wireless provider, mobile operator, etc.) in the correlation layer 30. The network operator is also capable of detecting communications from a commercial user. The present disclosure utilizes this data to provide a passive monitoring solution to detect potential fraud due to a SIM swap scam. By passive, this solution can use the correlation layer 30 to detect potential fraud from passive traffic monitors in a wireless network.

Figure 3:
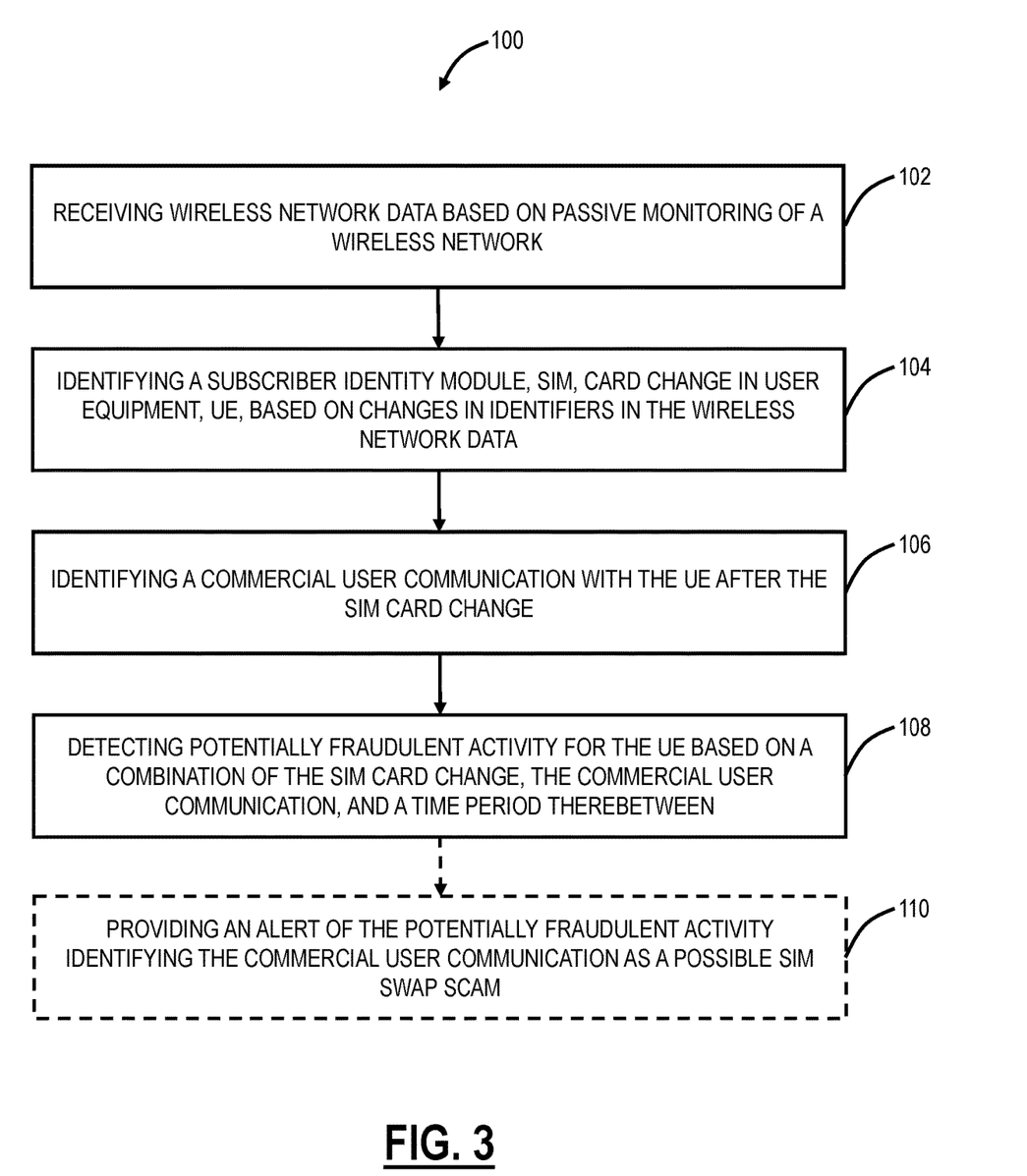
FIG. 3 is a flowchart of a process for SIM swap scam detection based on passive monitoring.

FIG. 3 is a flowchart of a process 100 for SIM swap scam detection based on passive monitoring. The process 100 can be implemented as a method having steps, a system including at least one processor and memory with instructions that, when executed, cause the at least one processor to implement the steps, and a non-transitory computer-readable medium having instructions stored thereon for programming at least one processor to perform the steps.

The process 100 includes receiving wireless network data based on passive monitoring of a wireless network 20 (step 102); identifying a subscriber identity module, SIM, card change in user equipment, UE, based on changes in identifiers in the wireless network data (step 104); identifying a commercial user communication with the UE after the SIM card change (step 106); and detecting potentially fraudulent activity for the UE based on a combination of the SIM card change, the commercial user communication, and a time period therebetween (step 108).

The process 100 can further include providing an alert of the potentially fraudulent activity identifying the commercial user communication as a possible SIM swap scam (step 110). The alert can include the IMSI/SUPO contents. The alert can be to the commercial user for remediation of an affected account associated with a user of the UE. Remediation can include locking or freezing an account until the user (not the malicious actor) recovers the UE and verifies her identity.

The SIM card change can be identified based on IMSI/SUPI and MSISDN changes detected in the wireless network data. For example, the IMSI/SUPI and the MSISDN are stored as a pair and the SIM card change includes a change in any stored pair in a database. This can be referred to as a couple—IMSI/SUPI and MSISDN couples, and these data can be from the passive monitoring. For example, data packets can include the IMSI/SUPI and MSISDN couples. This can be stored in a database along with a timestamp indicating a last extraction. The couple or stored pairs in the database can be deleted after a predetermined storage duration and deleted thereafter based on a time of last activity.

A SIM card change can be identified by comparing extracted IMSI/SUPI and MSISDN contents to stored IMSI/SUPI and MSISDN couples to identify when a different IMSI is assigned to a same MSISDN (indicating a porting of a phone number to a new physical device). Of course, this change by itself can happen legitimately all the time. For example, when a user gets a new device, loses a device, changes service, etc. The present disclosure utilizes a second factor, namely commercial user communication in conjunction with the SIM card change in a short time period.

The view is a SIM card change plus a commercial user communication related to user accounts may be an indication of potential fraud. Even if it is not fraudulent, there is a reason to be careful because the commercial user is sending account related information to a new device—again, this is a potential weakness in 2FA. As described herein, the commercial user can be a social network, a company, an organization, a bank, a financial institution, or any online provider where the user has an account.

The commercial user communication can be account related, e.g., 2FA, password reset, account notifications, etc. The commercial user communication can be in a data packet where the IMSI/SUPI and MSISDN couple is detected as changed. In an embodiment, the commercial user communication includes a short message service, SMS, communication. The commercial user communication can be detected based on any of a short code number and an alphanumeric sender identifier. In another embodiment, the commercial user communication can be detected based on detection of an identifier of a commercial user in packet data to the UE. In a further embodiment, the commercial user communication can be a voice call, such as from a predetermined number being associated with account services for commercial user.

The time period can be adjusted based on feedback including false positives and false negatives. In an embodiment, the time period is for example smaller than 2 days. In another example, it is smaller than 1 month. In yet another example, it is smaller than 12 hours.

The identifying steps utilize information in packets stored in the wireless network data. The wireless network data can include historical data to avoid false alarms. In an embodiment, the solution must run a minimum amount of time (system setup time) so that new IMSI/SUPI-MSISDN couples are not detected as threat during the system setup time and to prevent to generate false alarms.

In an embodiment, the operator can only analyze identities belonging to its monitored network. Therefore, it is not possible to apply any security policies if the phone number has been fraudulently ported to another network operator.

However, this new ported network operator could detect it by using the same method and applying adapted security policies.

Once the network operator obtains the fraud alert from the monitoring solution, it can activate a series of fraud control actions such as blocking any further SMS messages directed to the changed IMSI/SUPI, sending fraud alerts to service and content providers, etc. Further, while there may be false alerts, it is important to note that users will likely understand since there is a weakness in the 2FA and this approach providers superior protection. In an embodiment, there can be a publication of a new SIM card for a IMSI/SUPI-MSISDN couple where this marks the SIM card change as legitimate, such as when a user physically visits a wireless provider's store and presents identification.

Example Processing Device Architecture

Figure 4:
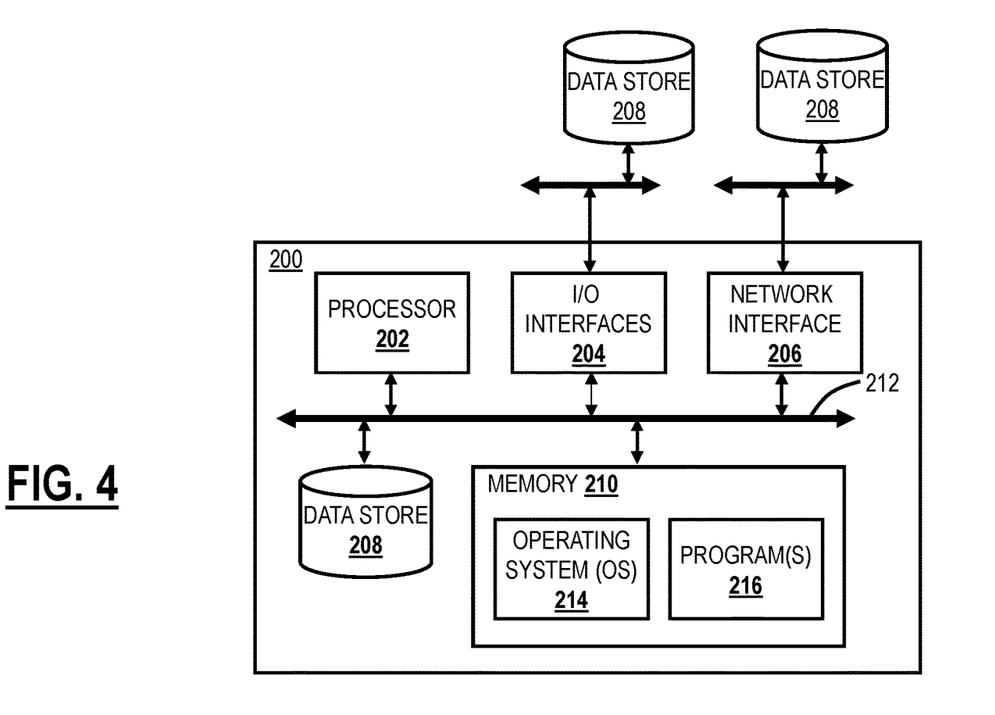
FIG. 4 is a block diagram of a processing device, which may be used in the wireless network and the correlation layer of FIG. 2.

FIG. 4 is a block diagram of a processing device 200, which may be used in the wireless network 20 and the correlation layer 30. The processing device 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the processing device 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory 210, to communicate data to and from the memory 210, and to generally control operations of the processing device 200 pursuant to the software instructions. The I/O interfaces 204 may be used to receive user input from and/or for providing system output to one or more devices or components.

The network interface 206 may be used to enable the processing device 200 to communicate on a network, such as the Internet and the wireless network 20. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the processing device 200, such as, for example, an internal hard drive connected to the local interface 212 in the processing device 200. Additionally, in another embodiment, the data store 208 may be located external to the processing device 200 such as, for example, an external hard drive connected to the I/O interfaces 204 (e.g., SCSI or USB connection). In a further embodiment, the data store 208 may be connected to the processing device 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A method comprising steps of:
receiving wireless network data based on passive monitoring of a wireless network, wherein the passive monitoring includes capturing data packets from the wireless network at specific points;
identifying a subscriber identity module (SIM) card change in user equipment (UE) based on changes in identifiers in the captured data packets, wherein the SIM card change is identified based on i) international mobile subscriber identity (IMSI) or subscription permanent identifier (SUPI) and ii) Mobile Subscriber Integrated Services Digital Network (ISDN) Number (MSISDN) changes detected in the wireless network data, wherein the i) IMSI or SUPI and ii) in the MSISDN are stored as a pair in a database, and wherein the SIM card change is identified based on comparing extracted IMSI or SUPI and MSISDN contents to IMSI or SUPI and MSISDN pairs in the database;
identifying a commercial user communication with the UE after the SIM card change, wherein the commercial user communication is determined to be commercial based on any of i) a short message service, SMS, communication including any of a short code number and an alphanumeric sender identifier and ii) detection of an identifier of the commercial user in packet data to the UE, in the captured data packets, wherein the specific points are located separate from the UE and the commercial user such that the UE and the commercial user are unaware of the passive monitoring; and
detecting potentially fraudulent activity for the UE based on a combination of the SIM card change, the commercial user communication, and the length of a time period between the SIM card change and the commercial user communication.

2. The method of claim 1, wherein the steps further include
providing an alert of the potentially fraudulent activity identifying the commercial user communication as a possible SIM swap scam.

3. The method of claim 2, wherein the alert includes international mobile subscriber identity (IMSI) contents.

4. The method of claim 2, wherein the alert is to the commercial user for remediation of an affected account associated with a user of the UE.

5. The method of claim 1, wherein stored pairs in the database are deleted after a predetermined storage duration and deleted thereafter based on a time of last activity.

6. The method of claim 1, wherein the time period is adjusted based on feedback including false positives and false negatives.

7. The method of claim 1, wherein the wireless network data includes historical data to avoid false alarms.

8. A non-transitory computer-readable medium including instructions executable by one or more processors that, in response to such execution, cause the one or more processors to perform steps of:
receiving wireless network data based on passive monitoring of a wireless network, wherein the passive monitoring includes capturing data packets from the wireless network at specific points;
identifying a subscriber identity module (SIM) card change in user equipment (UE) based on changes in identifiers in the captured data packets, wherein the SIM card change is identified based on i) international mobile subscriber identity (IMSI) or subscription permanent identifier (SUPI) and ii) Mobile Subscriber Integrated Services Digital Network (ISDN) Number (MSISDN) changes detected in the wireless network data, wherein the i) IMSI or SUPI and ii) in the MSISDN are stored as a pair in a database, and wherein the SIM card change is identified based on comparing extracted IMSI or SUPI and MSISDN contents to IMSI or SUPI and MSISDN pairs in the database;
identifying a commercial user communication with the UE after the SIM card change, wherein the commercial user communication is determined to be commercial based on any of i) a short message service, SMS, communication including any of a short code number and an alphanumeric sender identifier and ii) detection of an identifier of the commercial user in packet data to the UE, in the captured data packets, wherein the specific points are located separate from the UE and the commercial user such that the UE and the commercial user are unaware of the passive monitoring; and
detecting potentially fraudulent activity for the UE based on a combination of the SIM card change, the commercial user communication, and the length of a time period between the SIM card change and the commercial user communication.

9. The method of claim 1, wherein the method is performed by a network operator of the wireless network.

10. The method of claim 1, wherein the steps further include
responsive to the detecting potentially fraudulent activity for the UE, blocking any subsequent messages to the UE via the wireless network.

11. The method of claim 1, wherein the steps further include:
responsive to a new IMSI/SUPI and MSISDN pair being published to the database, presuming the SIM card change to be legitimate.

12. A processing device comprising:
one or more processors; and
memory storing instructions that, when executed, cause the one or more processors to receive wireless network data based on passive monitoring of a wireless network, wherein the passive monitoring includes capturing data packets from the wireless network at specific points, identify a subscriber identity module (SIM) card change in user equipment (UE) based on changes in identifiers in the captured data packets, wherein the SIM card change is identified based on i) international mobile subscriber identity (IMSI) or subscription permanent identifier (SUPI) and ii) Mobile Subscriber Integrated Services Digital Network (ISDN) Number (MSISDN) changes detected in the wireless network data, wherein the i) IMSI or SUPI and ii) in the MSISDN are stored as a pair in a database, and wherein the SIM card change is identified based on comparing extracted IMSI or SUPI and MSISDN contents to IMSI or SUPI and MSISDN pairs in the database;

identify a commercial user communication with the UE after the SIM card change, wherein the commercial user communication is identified to be commercial based on any of i) a short message service, SMS, communication including any of a short code number and an alphanumeric sender identifier and ii) detection of an identifier of the commercial user in packet data to the UE, in the captured data packets, wherein the specific points are located separate from the UE and the commercial user such that the UE and the commercial user are unaware of the passive monitoring, and detect potentially fraudulent activity for the UE based on a combination of the SIM card change, the commercial user communication, and the length of a time period between the SIM card change and the commercial user communication.

13. The processing device of claim 12, wherein the instructions that, when executed, cause the one or more processors to provide an alert of the potentially fraudulent activity identifying the commercial user communication as a possible SIM swap scam.

14. The processing device of claim 12, wherein the commercial user communication includes a short message service (SMS) communication.

15. The processing device of claim 12, wherein the commercial user communication is detected based on detection of an identifier of a commercial user in packet data to the UE.

16. The processing device of claim 12, wherein the time period is adjusted based on feedback including false positives and false negatives.

17. The non-transitory computer-readable medium of claim 8, wherein the steps further include responsive to the detecting potentially fraudulent activity for the UE, blocking any subsequent messages to the UE via the wireless network.

18. The non-transitory computer-readable medium of claim 8, wherein the steps further include providing an alert of the potentially fraudulent activity identifying the commercial user communication as a possible SIM swap scam.

* * * * *